J. PERRIE.
NUT LOCK.
APPLICATION FILED SEPT. 18, 1907.
921,278.
Patented May 11, 1909.
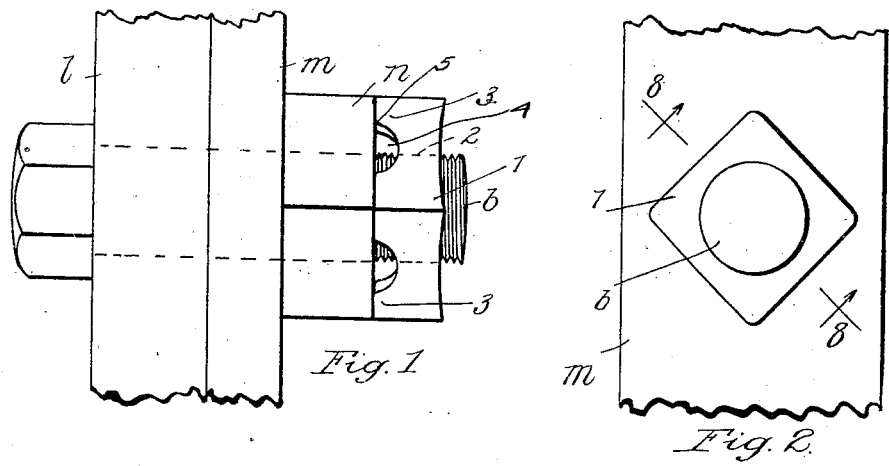
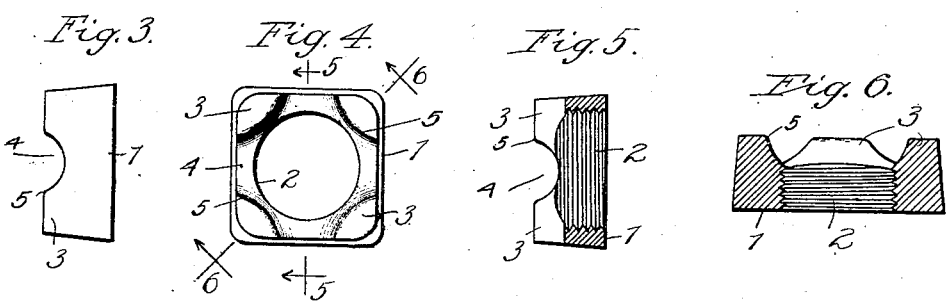
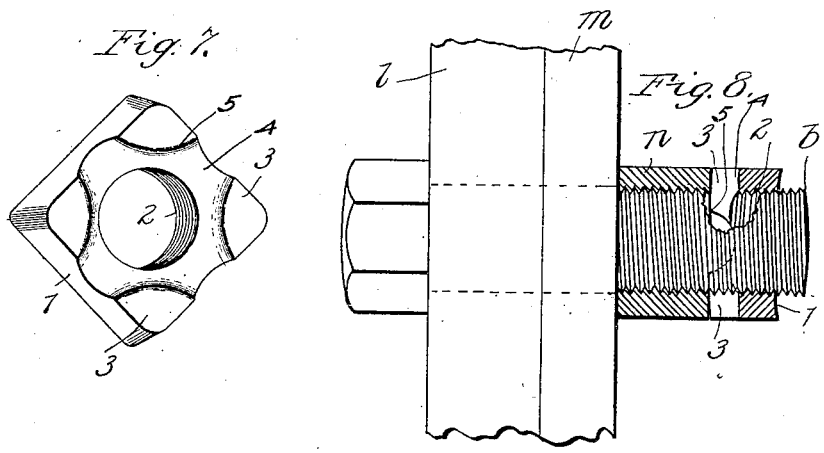
Witnesses
George C. Higham.
Leonard W. Novander.
Inventor
John Perrie
By Charles A. Brown
Attorney

UNITED STATES PATENT OFFICE.

JOHN PERRIE, OF CHICAGO, ILLINOIS.

NUT-LOCK.

No. 921,278.　　　Specification of Letters Patent.　　　Patented May 11, 1909.

Application filed September 18, 1907. Serial No. 393,496.

*To all whom it may concern:*

Be it known that I, JOHN PERRIE, citizen of the United States, residing at Chicago, in the county of Cook and State of Illinois, have invented a certain new and useful Improvement in Nut-Locks, of which the following is a full, clear, concise, and exact description, reference being had to the accompanying drawings, forming a part of this specification.

My invention relates to nut locks, its object being to provide a more efficient device of this kind.

There are a great number of nut locks on the market, but they are all more or less impracticable, and their efficiency is not lasting.

The nut lock of my invention is simple and practicable, and involves several features and points of construction which make its locking qualities and efficiency very great and lasting.

I shall describe my invention by reference to the accompanying drawings, in which—

Figure 1 is a side elevation of a bolt in actual service with the nut lock applied; Fig. 2 is an end view of Fig. 1; Fig. 3 is a side view of the locking nut; Fig. 4 is a plan view of the inside of the lock nut; Fig. 5 is a sectional view taken on line 5—5 of Fig. 4. Fig. 6 is a sectional view taken on line 6—6 of Fig. 4; Fig. 7 is a perspective view of the lock nut, and Fig. 8 is a sectional view taken on line 8—8 of Fig. 2.

The lock nut comprises a polygonal, preferably square, body part 1, having therethrough the threaded central opening 2 for receiving the threads of the bolt whose nut it is desired to lock. Extending from each corner of one face of the body part is a foot or lug 3, these feet being comparatively heavy and stocky. The feet are preferably formed by forming the cylindrical grooves 4 which extend from the edges of the nut to the central opening, as best shown in Figs. 4 and 7. These cylindrical grooves leave the edge at the base of the feet well rounded and therefore give the feet great strength. The inner edge 5 of the feet is also slightly rounded. The sides of the lock nut are also preferably tapered slightly in the direction of the feet, as best shown in Figs. 3, 5 and 7.

The method of application is shown in Figs. 1, 2 and 8. The bolt *b* is shown as utilized for clamping the members *l* and *m* together. The nut *n* is drawn up as tightly as desired on the bolt and a locking nut is then applied to the threads, the feet engaging against the nut. When the wrench is applied to the locking nut and great turning stress exerted thereon, the feet slide over the face of the nut. The body part of the nut is worked up on the threads and becomes bowed or dished, as shown, the diameter of the nut threads at the outer end becoming reduced, and therefore causing a very great gripping and clamping action on the threads of the bolt, without in any way harming the threads. Owing to the bowing or dishing of the body part, the feet are spread outwardly, their rounded inner edges finally engaging the nut *n* and securing a very firm and lasting grip and hold thereon, the outer edges of the feet being then slightly away from the nut face. The amount of bevel given the nut is such that the edges of the nut will become horizontal after the lock nut has been drawn up to clamp the nut. With this bevel arrangement, the locking nut can be most efficiently applied; the bevel being inwardly toward the main nut *n*, the wrench will be held on the locking nut and will not slip therefrom, and when the locking nut is to be finally drawn home, its outer faces are practically parallel and give the best grip for the wrench. The locking nut is preferably made one size smaller than the main nut, but it may be of the same shape and size as the main nut, as shown, and in this case, the bevel performs another function. When the locking nut is first applied, the ends of the feet are within the edges of the main nut, but after the locking nut has been drawn home, the feet spread until the sides of the lock nut are parallel with the sides of the main nut, thus giving a very neat appearance. Where the engagement is between the ends 5 of the lock nut and the main nut, the resistance to unlocking is very much greater than if the entire end faces of the feet engage with the main nut. The outer part of the feet ends being slightly away from the main nut, the tendency will be for the feet to return inwardly to bring the entire surfaces of the feet into contact with the main nut, and thus there is a constant force exerted against the body part and a clamping force constantly exerted between the body part threads and the bolt threads.

I do not wish to be limited to the precise construction which I have shown, as changes may readily be made which would still come within the scope of my invention. The main features are the provision of substantially heavy feet extending from a comparatively heavy body part, with the edges well rounded, and the outer edges of the feet being also slightly rounded. These features, together with the bevel arrangement of the sides of the nut, produce a device which has been found to be exceedingly efficient and whose efficiency and clamping qualities are lasting.

I claim as new and desire to secure by Letters Patent:

1. A lock nut comprising a polygonal body part having a central opening provided with continuous and unbroken threading, recesses formed in the bearing face of the nut so as to leave bearing feet at the corners of the bearing face, such recesses so formed as to force practically the whole circumference of the outer thread of the nut against the inclosed thread when the nut is forced into clamping engagement.

2. A lock nut comprising a polygonal body part having a central opening provided with continuous and unbroken threading, the polygonal faces normally converging toward the bearing face, the bearing face of the nut so conformed as to spring the nut and bring opposite polygonal faces into practically parallel planes when the nut is forced into clamping engagement.

3. A lock nut comprising a polygonal body part having a central opening provided with continuous and unbroken threading, two rounded grooves, each somewhat wider than the central opening, formed in the bearing face from side to side and at right angles to each other, such grooves so formed as to leave bearing feet at the four corners of the bearing face, such feet having arched connections to the body of the nut, such arched connections serving to compress practically the whole circumference of the outer thread of the nut when the nut is forced into clamping engagement.

4. A lock nut comprising a polygonal body part having a central opening provided with continuous and unbroken threading, recesses formed in the bearing face of the nut so as to leave bearing feet at the corners of the bearing face, such recesses so formed as to force practically the whole circumference of the outer thread of the nut against the inclosed thread when the nut is forced into clamping engagement, the polygonal faces of the nut normally converging toward the bearing face and the bearing face of the nut so conformed as to spring the nut and bring opposite polygonal faces into practically parallel planes when the nut is forced into clamping engagement.

In witness whereof, I hereunto subscribe my name this 14th day of Sept. A. D., 1907.

JOHN PERRIE.

Witnesses:
 ROBT. W. WILSON,
 ANDREW J. CONLIN.